M. H. MADSEN.
MANURE SPREADER.
APPLICATION FILED SEPT. 21, 1914.
1,234,362.
Patented July 24, 1917.
2 SHEETS—SHEET 2.
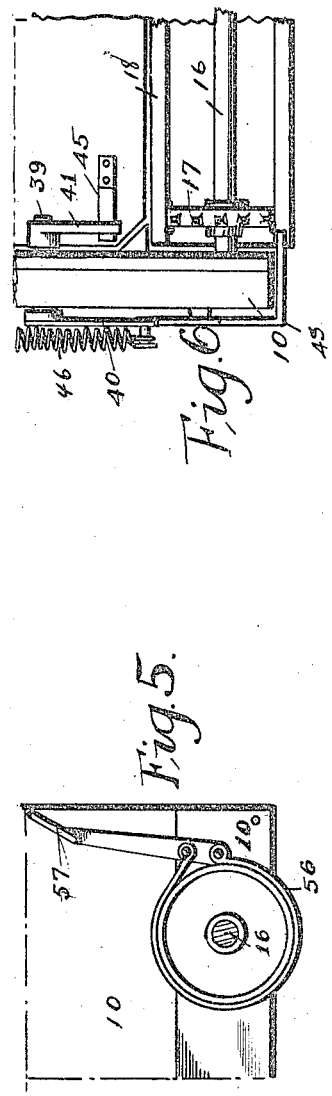
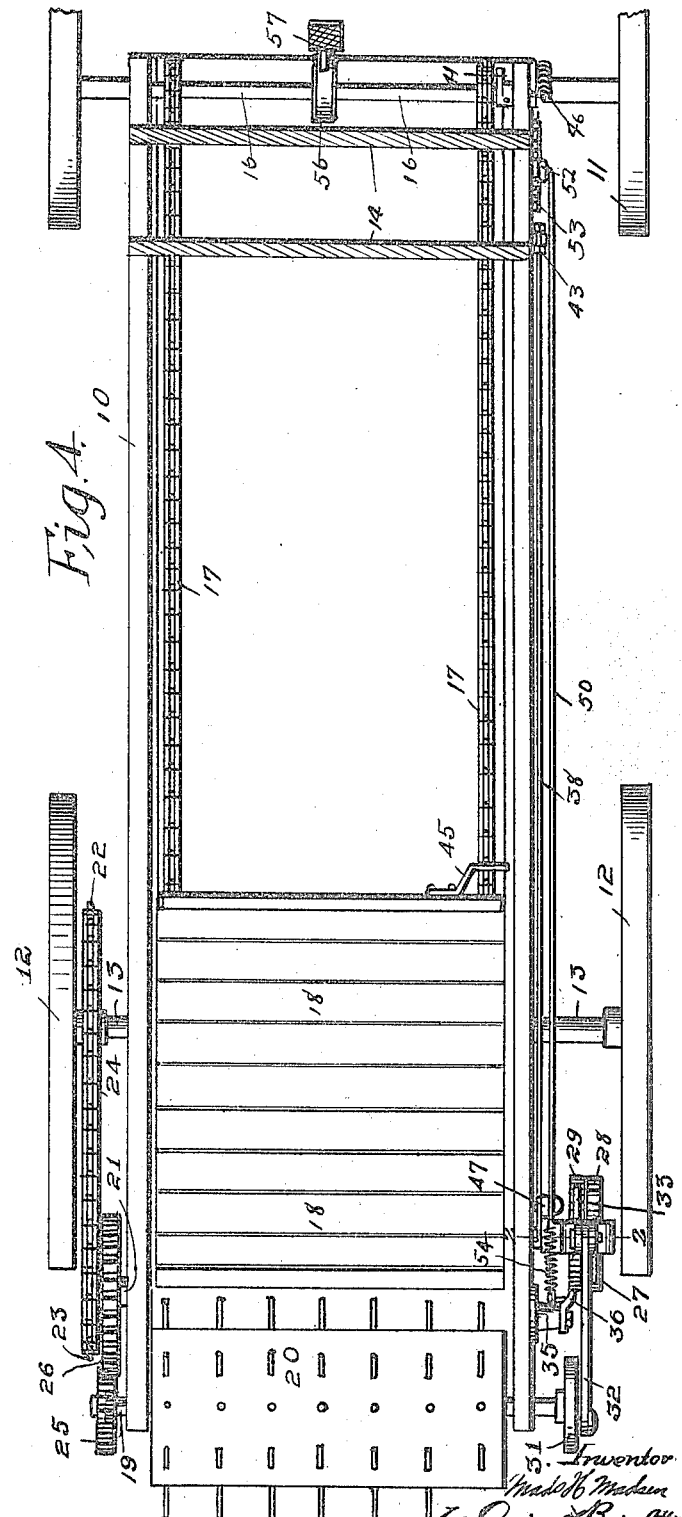

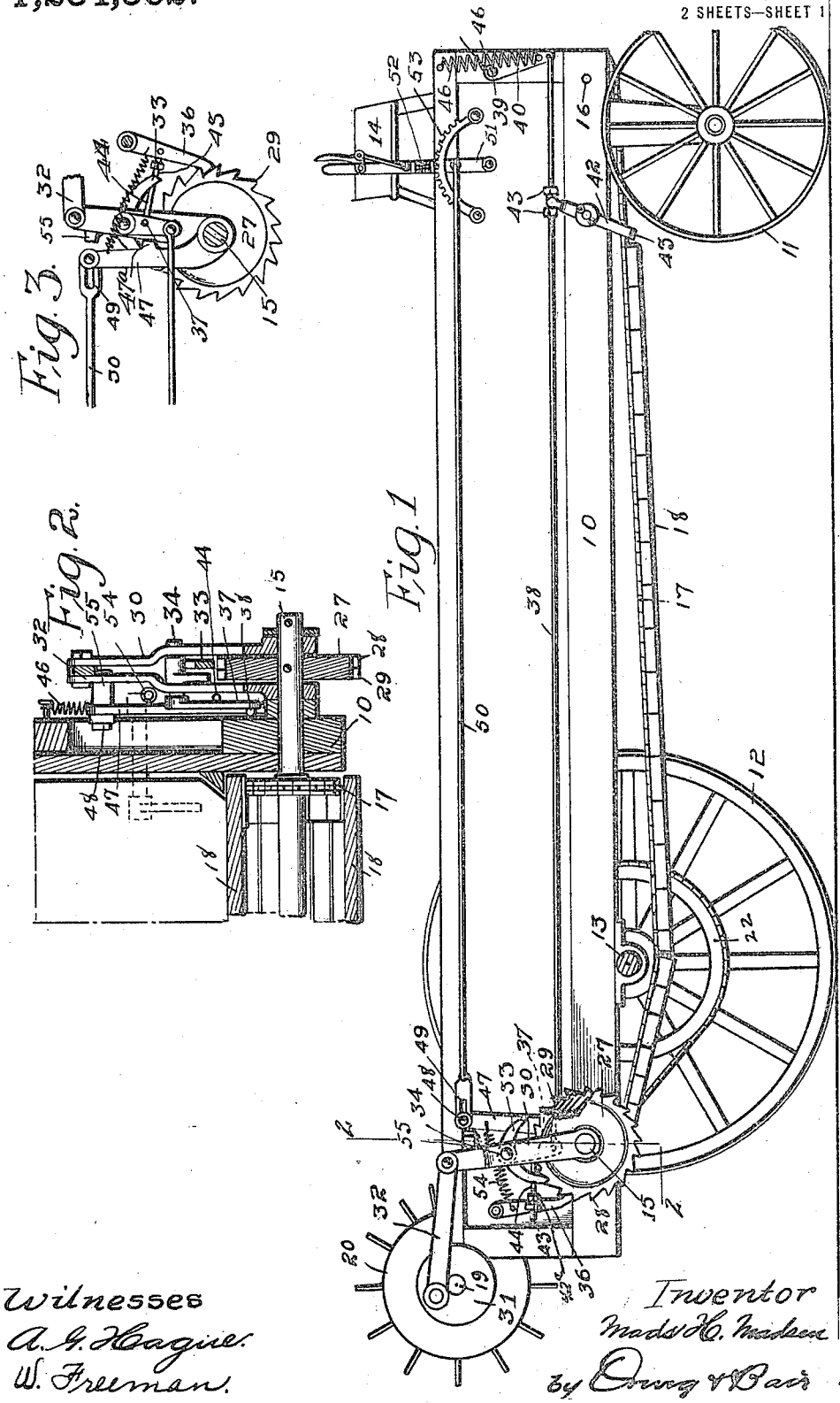

UNITED STATES PATENT OFFICE.

MADS H. MADSEN, OF KIMBALLTON, IOWA.

MANURE-SPREADER.

1,234,362.

Specification of Letters Patent.

Patented July 24, 1917.

Application filed September 21, 1914. Serial No. 862,819.

*To all whom it may concern:*

Be it known that I, MADS H. MADSEN, a citizen of the United States, and resident of Kimballton, in the county of Audubon and State of Iowa, have invented a certain new and useful Manure-Spreader, of which the following is a specification.

The object of my invention is to provide a manure spreader of simple, durable and inexpensive construction.

More particularly, it is my object to provide a manure spreader of the type having a bed in the bottom of which is mounted a movable platform, which machine has mechanism for operating the movable platform from traction wheels, and which has mechanism for automatically reversing the direction of movement of the moving platform when said platform reaches either the forward or rearward limit of its movement.

Still a further object is to provide such a device having a gearing mechanism interposed between the drive wheels and the spreader cylinder, and gearing mechanism for operating the movable platform from the spreader cylinder, and suitable means for controlling the relative speed of movement of the endless platform and the spreader cylinder, and for readily throwing the spreader cylinder out of gear with the platform.

Still a further object is to provide in such a mechanism suitable means for controlling the speed of movement of the movable platform with relation to that of the spreader cylinder and the drive wheels.

My invention consists in certain details, in the construction, combination and arrangement of the various parts of the device, whereby the objects contemplated are attained, as hereinafter more fully set forth, pointed out in my claims and illustrated in the accompanying drawings, in which:

Figure 1 shows a side elevation of the manure spreader, embodying my invention.

Fig. 2 shows a detail, sectional view of the same, taken on the line 2—2 of Fig. 1.

Fig. 3 shows a detail view of part of the ratchet mechanism.

Fig. 4 shows a top or plan view of the manure spreader, the seat supporting members being shown in section.

Fig. 5 shows a detail view of the band brake, and

Fig. 6 is a detail view of the part of the mechanism at the front of the manure spreader.

In the accompanying drawings I have used the reference numeral 10 to indicate generally the bed or box of a manure spreader mounted on the front wheels 11 and on the rear wheels 12. The rear wheels 12 rotate on the axle 13. Mounted on the forward end of the bed 10 is a seat 14. Suitably mounted at the ends of the bed 10 are transverse shafts 15 and 16 on which shafts near their ends are mounted sprocket gears 17.

It will be understood that the sprocket gears on the shaft 16 are in line with the respective sprocket gears on the shaft 15. Sprocket chains 17 travel on the respective pairs of alined sprocket gears. The chains 17 carry transverse platform members 18, which form a movable platform. The platform made up of the transverse members 18 is of sufficient length to make a bottom for the manure spreader. Suitably mounted at the rear of the bed 10 on the shaft 19 is a spreader cylinder 20. Suitably mounted on the frame of the bed 10 is a shaft 21. Mounted on one of the wheels 12 is a sprocket gear 22 which is in line with the sprocket gear 23 on the shaft 21. A chain 24 travels on the sprocket gears 22 and 23. Mounted on the shafts 19 and 21 are pinions 25 and 26 in mesh with each other.

The gearing devices just described transmit power from the wheel 12 to the cylinder 20 and rotate the cylinder 20 in a direction opposite to the direction of rotation of the wheel 12. Mounted on the shaft 15 is a double ratchet gear 27, having formed on half of its periphery teeth 28, inclined in one direction and on the other half of its periphery teeth 29, inclined in a different direction. Fixed to the shaft 15, outside the double ratchet gear 27 is an upwardly inclined lever 30. Mounted on one end of the shaft 19 is a crank wheel 31. Pivoted off center to the crank wheel 31 is a pitman 32, one end of which is pivoted to the upper end of the lever 30. The lever 30 is preferably formed with two arms, as shown in Fig. 2, one arm being mounted in the shaft 15 on each side of the double ratchet 27. Pivotally mounted between the arms of the lever 30 above the ratchet 27 by means of the pin 34 is a double pawl 33, having arms extending from its pivotal point downwardly in opposite directions. It might further be stated that said double pawl 33 is rigidly connected to the member 34. One arm of said pawl is adapted to engage the teeth 28 and the other is adapted to engage the teeth 29. Pivoted to the box 10 near the ratchet 27 is a locking pawl 36, which is adapted to engage the teeth 28 to prevent movement of the ratchet 27 in one direction and to thereby prevent the platform 18 from moving forwardly in the machine when the machine is loaded.

For shifting the positions of the double pawl members 33 automatically during the operation of the manure spreader, the following means has been provided: Mounted on the pin 34 between the inner arm of the lever 30 and the box 10 is an arm 37, extending downwardly and pivoted at its lower end to the rod 38 which extends forwardly along the outside of the bed 10 to the front end of the spreader. A short shaft 39 is rotatably mounted in the front end of the wagon bed above the rod 38 and on the outer end of said short shaft is an arm 40, the lower end of which is pivoted to said rod 38. On the inside of the wagon bed a downwardly extending arm 41 is fixed on the shaft 39. Pivoted between its ends to the side of the wagon bed near the forward end thereof just below the rod 38 is an arm 42. The upper end of the arm 42 extends adjacent to the rod 38 between two nuts 43, spaced slightly apart on said rod. The lower end of the arm 42 is bent inwardly at 43. The parts just described are so arranged that when the members 18 move forwardly below the bed 10, until practically all of said members 18 have passed over the rear shaft 15 and the load has been wholly discharged, then the forward members 18 on the lower portions of the chains 17 engage the portion 43 of the arm 42 and force said portion forwardly, thereby forcing the arm 38 rearwardly. The arm 37 is thereby moved rearwardly, thereby rotating the pin 34 slightly and tilting the double pawl 33 until the forward arm thereof engages the teeth 29 and the rearward arm thereof clears the teeth 28. Fixed on the arm 37 is a rod 44, extending rearwardly and having on it a nut 42ª, adapted when the arm 38 is moved rearwardly to engage the pawl 36 and move said pawl 36 out of engagement with the teeth 28. It will readily be seen that when the wagon is drawn forward after the operation just described has been completed, the movement of the movable platform will be reversed and the portion thereof below the bed will be moved rearwardly while the portion thereof within the bed will be moved forwardly toward position for receiving another load. Mounted on the forward upper member 18 is a catch device 45, adapted when the forward upper member 18 is moved to the front end of the bed to engage the arm 41 and move said arm 41 forwardly, thereby rotating the shaft 39 and moving the arm 40 forwardly. By said movement, the rod 38 is moved forwardly, thereby tilting the pawls to position where the right hand arm thereof clears the teeth 29 and the left hand arm thereof engages the teeth 28. The movement of the movable platform is again reversed and when the wagon is moved said movable platform is moved in the direction for discharging the load.

Secured to the arm 40 and to the bed above the shaft 39 is a spring 46, which tends to draw the rod 38 to the extreme limit of its movement as soon as the spring 46 is swung past center in either direction by the movement of the arm 40. Pivoted to the shaft 15 is an upwardly extending arm 47, on which is a lug 47ª which extends into the path of movement of the arm 37. Mounted in the upper end of the arm 47 is a pin 48 which extends through an elongated slot 49 in a horizontal rod 50 which extends forwardly along the outside of the bed 10 and is pivoted at its forward end to a lever 51. On the lever 51 is a pawl 52, adapted to coact with a toothed sector 53. Secured to the pawl 36 and the arm 47 is a coil spring 54 which yieldingly holds the arm 47 at the rearward limit of its movement with relation to the slot 49. On the arm 30 is a lug 55, adapted to engage the arm 47 in certain positions of the movement of the arm 30.

I shall now describe the practical operation of the arm 47 and the parts connected therewith and their functions in the machine.

Assuming the lever 51 to be set in substantially upright position, then as the pitman 32 reciprocates and the arm 30 is moved forwardly in the machine, the arm 37 engages said arm 47 whereby the pawl 33 is tilted somewhat. To prevent such a tilting as would swing the pawl too far and operate the rod 38 to reverse the action of the pawls, the lug 55 is provided. Said lug engages the arm 47 before the pawl 33 tilts more than enough to allow the left hand engaging member thereof to clear the teeth 28 readily and forces the arm 47 forwardly in the slot 49. By adjusting the rod 50 longitudinally by means of the lever 51, the particular time in the rearward movement of the arm 30 when the lug 55 engages the arm 47 and thereby prevents further movement of the arm 37 and consequent tilting of the pawl 33 may be varied, as desired. It will be seen that all times in the movement of the arm 47 the spring 54 exerts yielding pressure on said arm to draw it rearwardly. It therefore appears that when the arm 30 begins its rearward movement, the spring 54 will draw the arm 47 rearwardly at the same time thereby continuing to hold the arm 37 in position to maintain the pawl 33 in its tilted position so that the pawl 33 clears one, two or more of the teeth 28 before engaging one of said teeth during the rearward movement of the arm 30. As soon as the lug 55 leaves the arm 47, which occurs when the bolt or pin 48 reaches the rear end of the slot 49, then the arm 47 ceases to affect the arm 37, which is quickly drawn by means of the spring 46 to position for causing the left hand pawl member 33 to engage the teeth 28. By varying the position of the rod 50 the pawl 33 can be caused to move the ratchet 27 one, two or three notches with each reciprocation of the pitman 32, as may be desired.

It will thus be seen that while a load is being discharged, the speed of rearward movement of the upper portions of the chains 17 may be regulated as may be desired by the operator. As will readily be seen the pawl 36 prevents the chains 17 from traveling in such a way as to carry the load forwardly during the unloading process. Such a traveling movement might occur where the wagon was traveling on a down grade. To prevent the free movement of the chains 17 rearwardly when the wagon was loaded, and referring now to the upper portion of the chains which support the members 18 which carry the load, means have been provided which will be described. Such a free rearward movement of the load might occur while the wagon was climbing a heavy up grade. Mounted on the shaft 16 in front of the wagon is a band brake 56 controlled by a foot pedal 57, which can be readily operated from the driver's seat.

It will be seen from the foregoing description that my improved manure spreader is provided with an apron mounted on endless chains and operated from the spreader cylinder 20. The automatic devices 42 and 45, hereinbefore described, and the parts connected therewith are so constructed and arranged that when the unloading of the wagon has been completed the movement of the chains and the members 18 carried thereby will be automatically reversed and said parts will be moved to position where they are above the bottom of the bed 10, when their direction of movement will again be automatically reversed.

It will be understood that suitable clutch devices, not shown, may doubtless be employed on my manure spreader for throwing the wheels 12 out of gear with the operative parts during ordinary travel on a road, etc. The endless chains and the members 18 are operated from the spreading cylinder so that the movable platform will be operated only when the cylinder is operated and the speed of the movable platform will bear a certain relation to the speed of the spreading cylinder. It appears, however, from the foregoing description that the relative speeds of the movable platform and the spreading cylinder may be varied somewhat by longitudinally moving the rod 50 and thereby affecting the pawl 33 in the manner hereinbefore described, whereby the pawl 33 will move the ratchet 27 a distance of one or more notches as the case may be with each revolution of the spreader cylinder. It also appears that means have been provided for preventing free movement of the movable platform when it is desired to prevent such movement. It may be mentioned that the lever 51 may be set in such a position as to cause the pawl 33 to be inoperative. This is accomplished by moving the lever 51 in the manner hereinbefore described, so that the pawl while reciprocating with the lever 30 will be held out of engagement with all but one tooth, so that while the pawl moves it does not affect the ratchet 27.

It will be understood that some changes may be made in the details of the construction of my manure spreader, and it is my intention to cover by this application any such changes which may be included within the scope of the following claims.

I claim as my invention:

1. In a manure spreader, a frame, supporting wheels therefor, transverse shafts mounted in said frame, an endless platform mounted on said shafts, a spreader cylinder shaft, means for transmitting power from some of said wheels to said spreader cylinder shaft, an arm pivotally mounted on one of said first shafts, a wheel mounted on said spreader cylinder shaft, a pitman pivoted at one end off center to said wheel and at the other end to said arm, a double ratchet mounted on one of said first shafts adjacent to said arm, a double pawl pivoted on said arm and adapted in different positions of its movement to be operatively connected with the different members of said ratchet, automatic means for changing the position of said pawl when said movable platform reaches either limit of its movement, adjustable means for controlling said pawl for causing it to engage one or more teeth of said ratchet at each reciprocation of said pitman, for reducing the movement of said movable platform with relation to the speed of said cylinder wheel, said means comprising an arm fixed with relation to said pawl, a rod pivoted to said arm, a trigger member pivoted on said frame arranged in the path of said movable platform and pivotally connected with said rod, a shaft, an arm fixed to said shaft and pivoted to said rod, a second arm fixed to said last described shaft, and means on said movable platform adapted to engage said last described arm.

2. In a manure spreader, a frame, supporting wheels therefor, an endless platform, a spreader cylinder shaft, means for transmitting power from some of said wheels to said last shaft, a double ratchet operatively connected with said endless platform, an arm pivotally mounted adjacent thereto, a wheel mounted on said spreader cylinder shaft, a pitman pivoted at one end off center to said wheel and at the other end to said arm, a double pawl carried by said arm and adapted in different positions of its movement to be operatively connected with the different members of said ratchet, automatic means for changing the position of said pawl when said movable platform reaches either limit of its movement, adjustable means for controlling said pawl for causing it to engage one or more teeth of said ratchet at each reciprocation of said pitman, for varying the speed of said movable platform with relation to the speed of said cylinder wheel, said means comprising an adjustable device operatively connected with said pawl for holding it out of engagement with the ratchet teeth during a part of the reciprocatory movement of said arm.

3. In a manure spreader, a frame, supporting wheels therefor, an endless platform, a spreader cylinder shaft, means for transmitting power from some of said wheels to said last shaft, a double ratchet operatively connected with said endless platform, an arm pivotally mounted adjacent thereto, a wheel mounted on said spreader cylinder shaft, a pitman pivoted at one end off center to said wheel and at the other end to said arm, a double pawl carried by said arm and adapted in different positions of its movement to be operatively connected with the different members of said rachet, adjustable means for controlling said pawl for causing it to engage one or more teeth of said rachet at each reciprocation of said pitman for varying the speed of said cylinder wheel, said means comprising an adjustable device operatively connected with said pawl for holding it out of engagement with the ratchet teeth during a part of the reciprocatory movement of said arm, and a second pawl pivoted to the frame adjacent to the ratchet and adapted to engage one member thereof to prevent movement when the first pawl is out of engagement therewith.

4. In a manure spreader, a body, front and rear supporting wheels therefor, a rotary spreader cylinder arranged near one end of the body, a traveling apron adapted to operate longitudinally of the body, gearing mechanism for transmitting rotation from the rear wheels to said spreader cylinder, means for operatively connecting said spreader cylinder and apron and said means including a ratchet and a pawl and means for adjusting said pawl and ratchet with relation to each other for varying the speed of movement of the apron with relation to the rear wheels and means for automatically reversing the direction of the motion of the ratchet when the apron reaches either limit of its movement.

5. In a manure spreader, a wheel mounted frame, an endless apron thereon, a spreader cylinder mounted adjacent to the rear end of the apron, means for imparting rotation to the spreader cylinder, a double ratchet operatively connected with the apron, an arm pivoted adjacent to said ratchet, a double ended pawl pivoted intermediate of its ends to said arm, each end thereof being adapted to engage one set of teeth on the ratchet when the pawl is in a predetermined position, means for swinging the arm on its pivot from the rotation of the spreader cylinder, a second pawl pivoted to the frame adjacent to said ratchet and adapted when engaged therewith to prevent rotation thereof in one direction, and means for automatically throwing said second pawl out of engagement when the ratchet is being rotated in the opposite direction through the movement of said arm and double pawl.

6. In a manure spreader, a wheel mounted frame, an endless apron thereon, a spreader cylinder mounted adjacent to the rear end of the apron, means for imparting rotation to the spreader cylinder, a double ratchet operatively connected with the apron, an arm pivoted adjacent to said ratchet, a double ended pawl pivoted intermediate of its ends to said arm, each end thereof being adapted to engage one set of teeth on the ratchet when the pawl is in a predetermined position, means for swinging the arm on its pivot by the rotation of the spreader cylinder, a second pawl pivoted to the frame adjacent to said ratchet and adapted when engaged therewith to prevent rotation thereof in one direction, and means for automatically throwing said second pawl out of engagement when the ratchet is being rotated in the opposite direction through the movement of said arm and double pawl, and means adapted to prevent movement of the apron in either direction not caused by the operation of the ratchet and double pawl.

7. In a gearing for operating the apron on a manure spreader, a shaft adapted to be operatively connected with the apron, a double ratchet fixed to the shaft, an arm pivoted at one end to said shaft, a double pawl pivoted to said arm and adapted to have each end engage one set of the ratchet teeth when the pawl is in certain predetermined positions, a second arm pivoted to said shaft adjacent to the first arm, adjustable means on said second arm adapted to coact with the double pawl and first arm to hold one end of the pawl out of engagement with the teeth during a predetermined portion of the movement of the first arm, a second pawl adapted to be pivoted to the frame of a manure spreader and to engage one set of the teeth on the double pawl, and means for disengaging said pawl from the teeth when the ratchet is being rotated in one direction.

Des Moines, Iowa, September 3, 1914.

MADS H. MADSEN.

Witnesses:
 HANS C. HANSEN,
 HANS MADSEN.

Copies of this patent may be obtained for five cents each, by addressing the "Commissioner of Patents, Washington, D. C."